United States Patent Office 3,740,343
Patented June 19, 1973

3,740,343
HIGH WATER CONTENT OIL-EXTERNAL MICELLAR DISPERSIONS
Stanley C. Jones and Wayne O. Roszell, Littleton, and Marvin A. Svaldi, Morrison, Colo., assignors to Marathon Oil Company, Findlay, Ohio
No Drawing. Continuation-in-part of application Ser. No. 829,739, Dec. 26, 1967, now abandoned, which is a division of application Ser. No. 693,177, Dec. 26, 1967, now Patent No. 3,497,006. This application Dec. 21, 1970, Ser. No. 100,398
Int. Cl. B01j 13/00
U.S. Cl. 252—308                22 Claims

ABSTRACT OF THE DISCLOSURE

A novel high water content oil-external micellar dispersion (containing 55% to about 90% water) is obtained by mixing about 4 to about 40% hydrocarbon, at least 4% surfactant, about 0.01% to about 20% cosurfactant, about 55% to about 90% aqueous medium and about 0.001% to about 4% by weight of electrolyte, the above percents based on total volume unless otherwise specified. The dispersion is compatible with crude oil and useful, for example, in secondary and tertiary subterranean flooding operations to recover crude oil.

CROSS REFERENCES TO RELATED APPLICATIONS

This is a continuation-in-part application of U.S. Ser. No. 829,739, now abandoned, which is a divisional application of U.S. Ser. No. 693,177 filed Dec. 26, 1967, now U.S. Pat. No. 3,497,006, titled "High Water Content Oil-External Micellar Dispersions," by Stanley C. Jones, Wayne O. Roszelle and Marvin A. Svaldi.

BACKGROUND OF THE INVENTION

Oil-external micellar dispersions are useful in secondary-type recovery. U.S. Pat. No. 3,254,714 to Gogarty et al. teaches the use of a microemulsion containing up to about 43% water in the recovery of crude oil. U.S. Pat. No. 3,307,628 to Sena suggests that a microemulsion containing 55% water can be effected if the water soluble surfactant and an oil soluble surfactant are present in the correct ratios.

U.S. 3,117,929 to McCoy et al. teaches micellar dispersion lubricant containing 1–70% water phase, a water soluble surfactant or hydrotropic salt in a concentration equivalent to 10–50% of the water phase, 30–99% by weight of an oil phase, and an oil soluble amphiphilic dispersant in a concentration equivalent to 5–60 weight percent of the oil phase. The oil soluble dispersant can be a mixture of an alkaline earth metal petroleum sulfonate and high molecular weight $C_8$–$C_{20}$ aliphatic alcohol, a mixture of an alkaline earth metal alkaryl sulfonate and a high molecular weight alcohol, etc. The water soluble surfactant can be alkali metal and ammonium salts of aliphatic fatty acids, naphthenic acids and sulfonic acids; salts of alkylamines and quaternary ammonium salts; polyalkylene ozide adducts of aliphatic alcohols and alkyl-substituted phenols, etc. McCoy's dispersions exhibit high viscosities, i.e. greater than 382 cs. at 100° F.

It has now been discovered that oil-external, relatively low-viscosity (e.g. 15–300 cp. at ambient temperature) micellar dispersions containing from 55% up to about 90% water can be prepared; among the many uses of these dispersions is the injection of 1–20% formation pore volumes to recover crude oil in a secondary-type recovery process.

DESCRIPTION OF THE INVENTION

The micellar dispersions of this invention are oil-external and contain at least 55% water. Water concentrations up to about 90% are useful with this invention. It is unexpected that such high water content oil-external micellar dispersions can be obtained and are useful to recover crude oil in a secondary-type recovery process. Water concentrations of at least about 70% are especially useful. These dispersions are useful for many applications, including lubricants, hydraulic fluids, etc.

Secondary-type oil recovery process, as used herein includes a tertiary recovery process. The term "micellar dispersion" as used herein is meant to include micellar solutions, "micro-emulsions" [Schulman and Montagne, Annals of the New York Academy of Sciences, 92, pp. 366–371 (1961)], "transparent" emulsions (Blair, Jr. et al., U.S. Pat. No. 2,356,205) and micellar dispersion technology taught by C. G. Sumner, Clayton's, The Theory of Emulsions and Their Technical Treatment, 5th edition, pp. 315–320 (1954). Micellar dispersions differ from emulsions in many ways, the strongest differentiation being that the former are thermodynamically stable whereas the latter are not.

The micellar dispersions of this invention are oil-external. That is, the hydrocarbon component of the micellar dispersion is external to the aqueous component.

The micellar dispersion is composed essentially of hydrocarbon, an aqueous medium (e.g. water, brackish water and brine water), surfactant sufficient to impart desired characteristics to the dispersion, cosurfactant, and optionally, electrolyte. Examples of volume amounts are about 4 to about 40% hydrocarbon, about 55% to about 90% aqueous medium, at least about 4% surfactant, about 0.01% to about 20% of a cosurfactant and about 0.001% to about 4% by weight of electrolyte. In addition, the micellar dispersion and/or subsequent slugs can contain corrosion inhibiting agents, bactericides, etc.

Examples of hydrocarbon include crude oil (both sweet and sour), partially refined fractions of crude oil (i.e. distillate cuts) and refined fractions thereof. Side cuts from crude oil columns (e.g. hydrocarbon streams having a boiling point of about 400–1100° F. at atmospheric pressure) and crude column overheads (e.g. hydrocarbon streams having a boiling point of about 75–400° F. at atmospheric pressure) are especially useful. Examples of preferred hydrocarbons include light and heavy straight-run gasoline, kerosene, diesel fuel, naphthas, and liquefied petroleum gases. Preferably, the hydrocarbon is crude oil or partially refined fractions thereof.

The aqueous medium can be soft water, brackish water, or a brine water. Preferably, the water is soft but it can contain small amounts of salts which are preferably characteristic of the subterranean formations being flooded.

Surfactants useful with the dispersions include non-ionic, cationic, and anionic surfactants. The surfactants have to have some degree of water and oil solubility. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyl-taurine oleamide, pentaerylthritol monostearate, polyglycerol monolaurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium sulfate, and triethanolamine laurate or triethanolamine oleate. Other useful surfactants include Duponol WAQE (a 30% active sodium lauryl sulfate marketed by DuPont Chemical Corporation, Wilmington, Delaware), Energetic W-100 (a polyoxyethylene alkyl phenol marketed by Armour Chemical Company, Chicago, Ill.), Triton X-100 (an alkylphenoxy polyethoxy ethanol marketed by Rohm & Haas, Philadelphia, Pa.) and Arquad 12-50 (a 50% active dodecyl trimethyl ammonium chloride marketed by Armour Chemical Company, Chicago, Ill.), and like materials.

Preferably, the surfactant is a petroleum sulfonate, also known as alkyl aryl naphthenic sulfonate. The cation of the sulfonate is monovalent. Examples of preferred surfactants are the sodium and ammonium petroleum sulfonates haivng an avearge equivalent weight of about 350 to about 520, and more preferably about 380 to about 470 and most preferably about 390 to about 440. The surfactant can be a mixture of low and high average equivalent weight sulfonates or a mixture of two or more different surfactants. Equivalent weight is defined as the molecular weight divided by the number of sulfonate groups on the molecule, thus the molecular weight of a monosulfonate would be equal to its equivalent weight.

The cosurfactants (also identified as cosolubilizers and semi-polar organic compounds) useful with the invention can be partially water soluble. However, cosurfactants having 0 to infinite water solubility are useful. Preferably, the cosurfactant has limited water solubility, e.g., from about 0.01% to about 20%, and more preferably, from about 0.05% to about 5% at ambient temperature. Examples of cosurfactants include alcohols, amino compounds, ethers, esters, aldehydes, and ketones and organic compounds containing two or more of hydroxy, aldo, epoxy, amino, chloro, or like groupings; the cosurfactant containing from 1 up to about 20 or more carbon atoms and preferably about 3 to about 16 carbon atoms and more preferably about 4 to about 8 carbon atoms. The cosurfactant is preferably an alcohol, e.g. isopropanol, n- and isobutanol, the amyl alcohols such as n-amyl alcohol, 1- and 2-hexanol, 1- and 2-octanol, decyl alcohols, alkaryl alcohols such as p-noyl phenol and alcoholic liquors such as fusel oil. Particularly useful alcohols include the primary butanols, primary pentanols, and primary and secondary hexanols. Concentrations of from about 0.01% to about 20% by volume of cosurfactant are useful in the micellar dispersion and more preferably from about 0.01 to about 5.0%. Mixtures of two or more cosurfactants are useful.

Electrolytes are useful within the oil-external micellar dispersions. Examples of such electrolytes include inorganic bases, inorganic acids, inorganic salts, organic bases, organic acids, and organic salts which are strongly or weakly ionized. Preferably, the electrolytes are inorganic bases, inorganic acids and inorganic salts, e.g. sodium hydroxide, sodium chloride, sodium sulfate, hydrochloric acid, sulfuric acid, and sodium nitrate. Examples of other useful electrolytes can be found in United States Pat. No. 3,330,343. The type and concentration of electrolyte will depend on the aqueous medium, surfactant, cosurfactant, hydrocarbon and the reservoir temperature. Generally, about 0.001% to about 4% by weight of electrolyte is useful. Micellar dispersions containing hydrophilic surfactants and high reservoir temperatures sometimes dictate the use of acids or salts whereas more oleophilic surfactants prefer electrolytes having a higher pH, e.g. NaOH. The electrolyte can be the salts within brackish or brine water.

The mobility of the oil-external micelar dispersion, when used in secondary and tertiary oil recovery operations, is desirably about equal to or less than the mobility of the formation fluids (i.e. combination of crude oil and interstitial water) flowing ahead of the dispersion. Preferably, the miscellar dispersion has a mobility favorable to protect against "fingering" in such a flooding operation. Generally, viscosities within the range of about 5 to about 300 cp. and preferably about 15 to about 100 cp. at ambient temperature are sufficient for most uses of the micellar dispersion.

Size of the micellar dispersion slug useful in flooding subterranean formations is from about 1% to about 20% formation pore volume. Larger pore volumes are useful but such may be economically unattractive. More preferably, from about 2% to about 10% formation pore volumes are useful and from about 3% to about 6% formation pore volumes give very efficient results.

When used in subterranean flooding operations, the dispersion can be followed by a mobility buffer. The size of the mobility buffer (also identified as the front portion of a drive material) can vary from about 5% up to about 75% formation pore volume and more preferably is from about 25% to about 60% formation pore volume. However, this volume can be adjusted, i.e. increased or decreased, to satisfy the particular reservoir being flooded.

The mobility buffer should have the proper mobility to protect the micellar dispersion from invasion by a water drive, i.e. to reduce fingering tendency of the drive water into the micellar dispersion. Preferably, the mobility of the mobility buffer is about equal to or less than that of the micellar dispersion. From about 5% to about 100% of the mobility buffer can have graded mobilities from a low of the micellar dispersion to a high of the water drive.

After the mobility buffer is injected into the subterranean formation, sufficient water drive is injected to move or displace the micellar dispersion and mobility buffer toward a production well in fluid communication with the subterranean reservoir. Displaced crude oil is recovered at the production well.

The micellar dispersion can be readily obtained by different mixing procedures, e.g. by mixing the surfactant and hydrocarbon, then the aqueous medium (can contain electrolyte) and finally cosurfactant to give the desired viscosity. Also, the dispersions are easily obtained by mixing the combination of surfactant, hydrocarbon, and cosurfactant with the desired amount of aqueous medium (can contain electrolyte).

The following examples are presented to illustrate working embodiments of the invention. Unless otherwise specified, percents are based on volume.

EXAMPLE I

This example is presented to show that different components within the micellar dispersion and different amounts thereof can be used to obtain stable oil-external micellar dispersions. Examples indicated in Table 1 are prepared at room temperature with minimal agitation.

The compositions of the micellar dispersions are indicated in Table 1:

The invention is not to be limited by the above examples. Rather, variations and modifications apparent

TABLE 1

| Sample | Surfactant | | Hydrocarbon | | Aqueous medium | | Cosurfactant | |
|---|---|---|---|---|---|---|---|---|
| | Percent | Type | Percent | Type | Percent | Type | Ml./500 ml. | Type |
| A | 5.2 | Ammonium petroleum sulfonate (average eq. wt.=440, 81% active) | 24.75 | Crude oil | 70 | 60% Henry plant water; 40% Palestine water [4]. | 0.08; 0.25 | n-amyl alchool isopropanol. |
| B | 10 | "Pyronate 50" [1] | 20 | ___do___ | 70 | ___do___ | | |
| C | 10 | "Petronate L" [2] | 20 | straight-run gasoline | 70 | ___do___ | 3.25 | n-hexanol. |
| D | 20 | "DuPonol WAQE" | 10 | ___do___ | 70 | Distilled water | 4.24 | n-amyl alcohol. |
| E | 10 | "Energetic W-100" | 20 | ___do___ | 70 | ___do___ | 14 | i-amyl alcohol. |
| F | 10 | "Triton X-100" | 20 | ___do___ | 70 | ___do___ | 8.5 | Do. |
| G | 20 | "Arquad 12-50" | 10 | ___do___ | 70 | ___do___ | 5.5 | Do. |
| H | 16.6 | Sodium petroleum sulfonate (avg. eq. wt.=465, 62% active). | 16.6 | ___do___ | 66.6 | ___do___ | 17.0 | Do. |
| | | | | | | | 1.3 | Isopropanol. |
| I | 10 | Ammonium petroleum sulfonate (avg. eq. wt.=440, 81% active). | 5 | Crude oil | 85 | 60% Palestine water [3] 40% Henry plant water [4]. | 2.5 | n-amyl alcohol. |

[1] Pyronate 50, a sodium petroleum sulfonate, average equivalent weight 350, sold by Sonneborn Chemical Co., 300 Park Avenue South, New York 10010.

[2] Petrolate L. a sodium petroleum sulfonate, average equivalent weight 422, sold by Sonneborn Chemical Co., 300 Park Avenue South, New York, 10010.

[3] Henry plant water is obtained from the Henry lease in Illinois; contains about 18,000 p.p.m. of dissolved salts and hereinafter is identified as Henry plant water.

[4] Palestine water is obtained from the Palestine water reservoir in Palestine, Illinois; contains about 420 p.p.m. of dissolved salts and hereinafter is identified as Palestine water.

NOTE.—The amount of cosurfactant is stated as ml. of cosurfactant per 100 ml. of liquid containing surfactant, hydrocarbon, and aqueous medium.

EXAMPLE II

Fired Berea sandstone cores 4 feet long by 3 inches in diameter are saturated with distilled water containing 18,000 p.p.m. of sodium chloride, flooded to irreducible water saturation with Henry crude oil (a sweet, black oil having a viscosity of about 7 cp. at 72° F.) and then reduced to residual oil saturation by waterflooding with Henry plant water. The characteristics of the cores are indicated in Table 3. Thereafter, there is injected into the core Table 3-indicated percent formation pore volumes of micellar dispersion. The compositions of these micellar dispersions are given in Table 2:

TABLE 2.—MICELLAR DISPERSION COMPOSITION

| Sample | Hydrocarbon (crude oil) (percent) | Surfactant (petroleum sulfonate) (percent) | Water (percent) | Cosurfactant (percent) |
|---|---|---|---|---|
| A | 28.70 | 9.10 | 60 PW/40 HPW (60.73) | NAA (0.99); IPA (0.48). |
| B | 28.52 | 8.75 | 60 PW/40 HPW (61.00) | PAA (1.26); IPA (0.47). |
| C | 18.07 | 8.60 | PW (71.50) | NAA (1.77); IPA (.06). |
| D | 12.93 | 8.70 | PW (76.06) | NAA (2.25); IPA (.06). |
| E | 9.20 | 8.74 | 60 PW/40 HPW (80.72) | NAA (0.89); IPA (0.45). |

NOTE.—In the water column HPW is Henry plant water and PW is Palestine water NAA is n-amyl alcohol; IPA is isoproanol; PAA is primary amyl alcohol.

The micellar dispersions are followed by the injection of 1.2 pore volumes of a mobility buffer slug composed of 1200 p.p.m. of No. 530 Pusher polymer (a high molecular weight partially hydrolyzed polyacrylamide marketed by Dow Chemical Company), 1 percent fusel oil, and the remainder Palestine water. Flooding of the core samples is effected at 72° F., results of the flooding tests are indicated in Table 3:

to those skilled in the art are meant to be included within the scope of this invention.

We claim:

1. An oil-external micellar dispersion compatible with crude oil, the dispersion consisting essentially of:
   (1) about 55% to about 90% by volume of the aqueous medium,
   (2) about 4% to about 40% by volume of a liquid hydrocarbon,
   (3) at least about 4% by volume of a petroleum sulfonate containing a monovalent cation, the petroleum sulfonate having an average equivalent weight of about 350 to about 520, and
   (4) about 0.01% to about 20% by volume of cosurfactant selected from the group consisting of alcohol, amino compound, ether, aldehyde, ketone, and organic compound containing two or more of hydroxy, aldo, epoxy, amino, chloro groups or mixtures thereof, or mixtures of said cosurfactants, the cosurfactant containing about 1 to about 20 carbon atoms.

TABLE 3

| Sample | Core characteristics | | | Micellar dispersion | | Percent crude oil recovery |
|---|---|---|---|---|---|---|
| | Effective porosity (percent) | Permeability (md.) | Residual oil saturation (percent) | Type | Percent formation pore volume injected | |
| A-1 | 17.6 | 114 | 34.7 | A | 1 | 40.3 |
| A-2 | 17.9 | 114 | 37.1 | A | 2 | 81.2 |
| A-3 | 20.1 | 561 | 34.4 | A | 4.1 | 91.5 |
| B-1 | 22.1 | 855 | 35.9 | B | 5 | 89.9 |
| C-1 | 18.8 | 165 | 36.6 | C | 2.5 | 90.9 |
| D-1 | 17.2 | 72 | 37.3 | D | 2 | 69.9 |
| D-2 | 18.7 | 154 | 36.1 | D | 5 | 100.0 |
| E-1 | 21.1 | 642 | 35.9 | E | 5 | 82.7 |

2. An oil-external micellar dispersion compatible with crude oil, the dispersion consisting essentially of:
 (1) about 55% to about 90% by volume of water,
 (2) about 4% to about 40% by volume of liquid hydrocarbon,
 (3) at least about 4% by volume of a petroleum sulfonate containing a monovalent cation, the petroleum sulfonate having an average equivalent weight within the range of about 350 to about 520, and
 (4) about 0.01% to about 20% by volume of cosurfactant containing about 1 to about 20 carbon atoms and wherein the cosurfactant has a water solubility of about 0.01% to about 20% at ambient temperature.

3. The dispersion of claim 2 wherein the petroleum sulfonate has an average equivalent weight of about 380 to about 470.

4. The dispersion of claim 2 wherein the cation of the petroleum sulfonate is sodium or ammonium.

5. The dispersion of claim 2 wherein the cosurfactant is an alcohol, amino compound, ether, ester, aldehyde, ketone, organic compound containing two or more of hydroxy, aldo, epoxy, amino, and chloro groups or mixtures of two or more of the above cosurfactants.

6. The dispersion of claim 2 wherein the water contains electrolyte which is an inorganic acid, inorganic base, or inorganic salt or combination thereof.

7. The dispersion of claim 6 wherein the electrolyte concentration is about 0.001% to about 4% by weight, based on the water contained in the dispersion.

8. An oil-external micellar dispersion compatible with crude oil, the dispersion consisting essentially of:
 (1) about 55% to about 90% by volume of water,
 (2) about 4% to about 40% by volume of liquid hydrocarbon selected from the group consisting of crude oil, partially refined fractions of crude oil and refined fractions of crude oil,
 (3) at least about 4% by volume of petroleum sulfonate having an average equivalent weight within the range of about 350 to about 520,
 (4) about 0.01% to about 20% by volume of cosurfactant selected from the group consisting of amino compound, ether, ester, alcohol, ketone, and aldehyde containing 1 to about 20 carbon atoms, and
 (5) about 0.001% to about 4% by weight of electrolyte.

9. The dispersion of claim 8 wherein the cosurfactant contains about 3 to about 16 carbon atoms.

10. The dispersion of claim 8 wherein the petroleum sulfonate has an average equivalent weight within the range of about 380 to about 470.

11. The dispersion of claim 8 wherein the cosurfactant is an alcohol.

12. An oil-external micellar dispersion compatible with crude oil, the dispersion comprised of:
 (1) about 70% to about 90% by volume aqueous medium,
 (2) about 4% to about 40% by volume of liquid hydrocarbon,
 (3) at least about 4% by volume of a petroleum sulfonate containing a monovalent cation, said sulfonate having an average equivalent weight of about 350 to about 525, and
 (4) about 0.01% to about 5% by volume of cosurfactant selected from the group consisting of alcohol, amino compound, ether, ester, aldehyde, ketone, and organic compound containing two or more of hydroxy, aldo, epoxy, amino, chloro groups or mixtures thereof, or mixtures of said cosurfactants, the cosurfactant containing about 1 to about 20 carbon atoms.

13. The dispersion of claim 12 wherein the surfactant is a petroleum sulfonate having an average equivalent weight within the range of about 380 to about 470.

14. The dispersion of claim 12 wherein the cosurfactant is an alcohol, amino compound, ether, ester, aldehyde, ketone, or mixtures of two or more of these compounds and wherein the cosurfactant contains about 3 to about 16 carbon atoms.

15. The dispersion of claim 12 wherein the micellar dispersion contains about 0.001% to about 4% by weight of electrolyte.

16. An oil-external micellar dispersion compatible with crude oil, the dispersion consisting essentially of:
 (1) about 60% to about 90% by volume of water,
 (2) about 4% to about 40% by volume of liquid hydrocarbon,
 (3) at least about 4% by volume of a petroleum sulfonate containing a monovalent cation and wherein the average equivalent weight of the sulfonate is within the range of about 350 to about 520, and
 (4) about 0.01% to about 5% by volume of an alcohol or hydroxy-containing organic compound containing 1 to about 20 carbon atoms.

17. The dispersion of claim 16 wherein the alcohol and the hydroxy containing organic compound has a water solubility of about 0.01% to about 20% at ambient temperature.

18. The dispersion of claim 16 wherein the hydrocarbon is substantially liquid at ambient temperature.

19. The dispersion of claim 16 wherein the average equivalent weight of the petroleum sulfonate is within the range of about 380 to about 470.

20. The dispersion of claim 16 wherein the average equivalent weight of the petroleum sulfonate is about 390 to about 440.

21. The dispersion of claim 16 wherein the micellar dispersion contains about 0.001 to about 4% by weight of an electrolyte which is an inorganic acid, inorganic base, inorganic salt, or a combination thereof.

22. The dispersion of claim 16 wherein the cosurfactant has a water solubility of about 0.01% to about 20% at ambient temperature.

References Cited

UNITED STATES PATENTS

| | | | |
|---|---|---|---|
| 2,355,591 | 8/1944 | Flaxman | 252—17υ |
| 2,356,254 | 8/1944 | Tehmann Jr. | 252—170 |
| 3,117,929 | 1/1964 | McCoy | 252—76 |
| 3,346,494 | 10/1967 | Robins et al. | 11—312 |
| 3,373,809 | 3/1968 | Cooke, Jr. | 166—273 |

OTHER REFERENCES

Clayton, Theory of Emulsions, 5th Ed. pp. 315–320.
Clayton, Theory of Emulsions, 5th Ed. pp. 321–329.

JOHN DAVID WELSH, Primary Examiner

U.S. Cl. X.R.

166—273, 275; 252—49.5;